United States Patent
Salomon et al.

(10) Patent No.: US 12,038,504 B2
(45) Date of Patent: Jul. 16, 2024

(54) COMPUTATIONAL NOISE COMPENSATION FOR ULTRASONIC SENSOR SYSTEMS

(71) Applicant: Valeo Schalter und Sensoren GmbH, Bietigheim-Bissingen (DE)

(72) Inventors: Sylvio Salomon, Bietigheim-Bissingen (DE); Marian Roeger, Bietigheim-Bissingen (DE); Uwe Kupfernagel, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 220 days.

(21) Appl. No.: 17/639,412

(22) PCT Filed: Sep. 7, 2020

(86) PCT No.: PCT/EP2020/074905
§ 371 (c)(1),
(2) Date: Mar. 1, 2022

(87) PCT Pub. No.: WO2021/044048
PCT Pub. Date: Mar. 11, 2021

(65) Prior Publication Data
US 2022/0334249 A1 Oct. 20, 2022

(30) Foreign Application Priority Data
Sep. 5, 2019 (DE) .................... 10 2019 123 822.6

(51) Int. Cl.
*G01S 15/52* (2006.01)
*G01S 7/52* (2006.01)
*G01S 15/931* (2020.01)

(52) U.S. Cl.
CPC ........ *G01S 15/526* (2013.01); *G01S 7/52006* (2013.01); *G01S 15/931* (2013.01)

(58) Field of Classification Search
CPC .. G01S 7/5273; G01S 7/52006; G01S 15/931; G01S 15/526; G01S 7/52004;
(Continued)

(56) References Cited

U.S. PATENT DOCUMENTS

| 5,124,954 A | 6/1992 | Hordijk | |
|---|---|---|---|
| 6,639,531 B1 * | 10/2003 | Melanson | H03M 7/302 341/143 |

(Continued)

FOREIGN PATENT DOCUMENTS

| DE | 102004031310 A1 | 1/2006 |
|---|---|---|
| DE | 102008016558 A1 | 10/2009 |

(Continued)

OTHER PUBLICATIONS

Tsai, External cavity quantum cascade lasers for spectroscopic applications; Dissertation, (Year: 2012).*

(Continued)

*Primary Examiner* — Daniel L Murphy
*Assistant Examiner* — Amie M Ndure
(74) *Attorney, Agent, or Firm* — Osha Bergman Watanabe & Burton LLP

(57) ABSTRACT

The present invention relates to a method for computational noise compensation for an ultrasonic sensor system (1) that is mounted in a concealed manner, in particular for a vehicle with a wall material (2), including the following steps:
detecting reference surroundings information (100) comprising noise signal information (3) relating to a wall material (2) and/or airborne sound signal information (4), using an ultrasonic sensor (5) of the ultrasonic sensor system (1);
(Continued)

Figure 1:
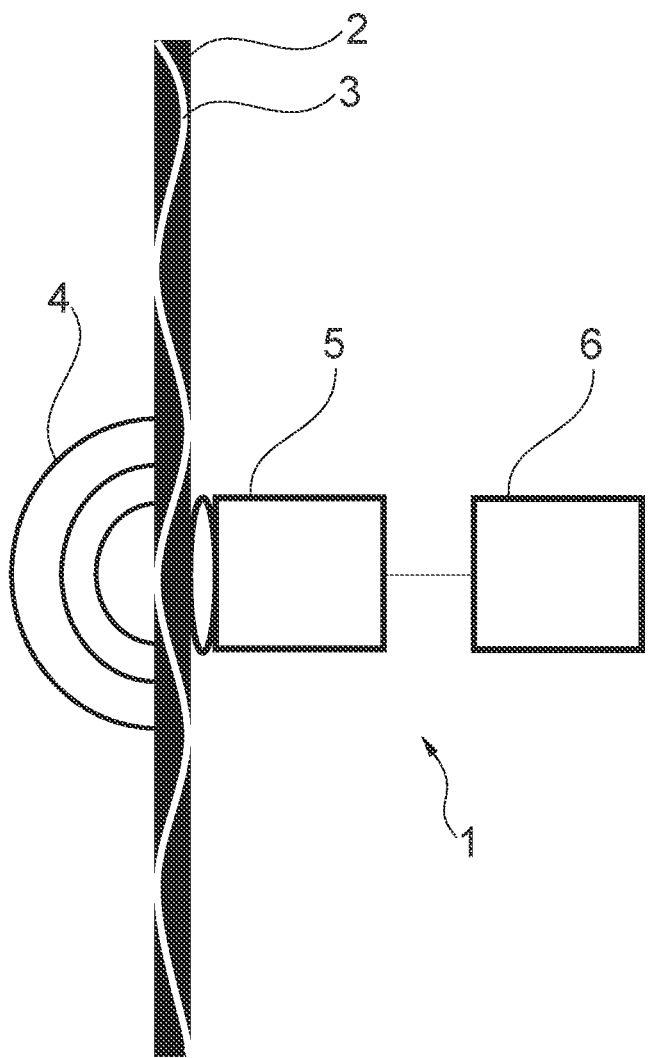

storing the reference surroundings information (200);

detecting real-time surroundings information (300) comprising noise signal information (3) relating to the wall material (2) and/or airborne sound signal information (4), using the ultrasonic sensor (5); and forming a difference signal between the pieces of surroundings information (400) of reference surroundings information and real-time surroundings information, using a computational unit (6).

The present invention also relates to a system for computational ultrasound compensation having means for performing the steps of the method. The present invention further relates to a vehicle having the system for computational ultrasound compensation. The present invention furthermore relates to a computer program, to a data carrier signal, and to a computer-readable medium.

15 Claims, 2 Drawing Sheets

(58) Field of Classification Search
CPC ............ G01S 15/101; G01S 2015/937; G01S 2007/52009
See application file for complete search history.

(56) References Cited

U.S. PATENT DOCUMENTS

| | | | | |
|---|---|---|---|---|
| 7,075,468 | B1* | 7/2006 | Pellon | H03M 3/37 341/143 |
| 8,294,605 | B1* | 10/2012 | Pagnanelli | H03M 3/30 341/145 |
| 8,489,666 | B1* | 7/2013 | Nikitin | H03G 5/18 708/819 |
| 9,117,099 | B2* | 8/2015 | Nikitin | G01R 29/02 |
| 9,467,113 | B2* | 10/2016 | Nikitin | H03H 17/0201 |
| 2003/0072363 | A1* | 4/2003 | McDonald | H04N 5/211 375/232 |
| 2003/0168838 | A1 | 9/2003 | Breed et al. | |
| 2008/0157940 | A1* | 7/2008 | Breed | B60R 21/013 340/425.5 |
| 2010/0149923 | A1 | 6/2010 | Bigliardi | |
| 2014/0195577 | A1* | 7/2014 | Nikitin | H03H 11/1256 708/304 |
| 2017/0012608 | A1* | 1/2017 | Nikitin | H03H 17/0219 |
| 2020/0218288 | A1* | 7/2020 | Johnson | G05D 1/0866 |
| 2022/0128352 | A1* | 4/2022 | Binder | G01S 15/42 |

FOREIGN PATENT DOCUMENTS

| | | | |
|---|---|---|---|
| DE | 102012106700 A1 | 1/2014 | |
| DE | 102013204910 A1 | 9/2014 | |
| DE | 102015116442 A1 | 3/2017 | |
| DE | 102017104148 A1 | 8/2018 | |
| DE | 102017127587 A1 | 5/2019 | |
| JP | 2009-020086 A | 1/2009 | |
| JP | 2017-173141 A | 9/2017 | |
| JP | 2019-086407 A | 6/2019 | |
| WO | 2007/012958 A2 | 2/2007 | |
| WO | WO-2007012958 A2 * | 2/2007 | ........... G01S 15/526 |
| WO | 2019/137784 A1 | 7/2019 | |
| WO | WO-2019137784 A1 * | 7/2019 | |

OTHER PUBLICATIONS

Office Action Issued in Corresponding Japanese Application No. 2022-514855, dated Sep. 19, 2023. (5 Pages with English Translation).

Office Action issued in Corresponding JP Application No. 2022-514855, Dated Mar. 14, 2023 (13 Pages with Translation).

International Search Report and Written Opinion in corresponding International Application No. PCT/EP2020/074905, mailed Nov. 27, 2020 (15 pages).

German Search Report issued in corresponding German Application No. 10 2019 123 822.6, dated Apr. 9, 2020 (8 pages).

Office Action issued in Corresponding Korean Application No. 2022-7011080, dated Dec. 12, 2023. (19 Pages with English Translation).

* cited by examiner

COMPUTATIONAL NOISE COMPENSATION FOR ULTRASONIC SENSOR SYSTEMS

The present invention relates to a method for computational noise compensation for an ultrasonic sensor system that is mounted in a concealed or unconcealed manner, in particular for a vehicle.

The present invention also relates to a system for computational noise compensation having means for performing the steps of the method.

The present invention further relates to a vehicle having the system for computational noise compensation.

The present invention furthermore relates to a computer program, comprising commands that, when the computer program is executed by a computer, cause the latter to perform steps of the method.

The present invention furthermore relates to a data carrier signal carrying the computer program.

The present invention furthermore relates to a computer-readable medium, comprising commands that, when executed by a computer, cause the latter to perform steps of the method.

Ultrasonic transducers or ultrasonic sensor systems for surroundings monitoring are typically mounted in vehicles in a unconcealed manner, that is to say openings in the wall material of the vehicle exist in the region of the ultrasonic transducer.

The concealed mounting of the ultrasonic transducers or ultrasonic sensor systems, which is thus invisible from the outside, is visually preferred but has not yet asserted itself to a large extent because the parasitic structure-borne sound amplitudes in the immediately adjacent vehicle structure, in particular in the wall material thereof, which consequently come about during an ultrasonic signal transmission operation and decay only slowly without further measures, considerably hamper reliable detection of the ultrasonic signals coupling in via the airborne route in the form of echoes.

In this respect, an ultrasonic sensor system mounted in a concealed manner for example in the case of a vehicle means that an ultrasonic sensor or a plurality of ultrasonic sensors is/are not visible from the outside. Ultrasonic signals emitted by the ultrasonic sensor system penetrate the wall material at which the sensor is arranged. During this process, ultrasonic signals penetrate the wall material twice for ultrasonic detection, specifically during the transmission and during the reception of the ultrasonic signal by the ultrasonic sensor system that is mounted in a concealed manner. In the process, the wall material is made to vibrate. These vibrations continue to resonate for such a long time that they interfere with the echo time-of-flight measurements.

It is known from the prior art to suppress these vibrations, also referred to as structure-borne sound, using mechanical means.

To nevertheless use concealed ultrasonic transducers for surroundings detection, the latest prior art discloses the attachment of materials for attenuating the structure-borne sound amplitudes in the immediately adjoining surroundings of said ultrasonic transducers. In other words, that structure in the adjoining region of the respective ultrasonic transducers to which the ultrasonic transducer membranes are mechanically coupled for emitting and receiving airborne ultrasound is damped in a targeted manner.

The laid-open application DE 10 2017 127 587 A1 discloses a damping mat made of butyl rubber, which is mixed with fibres to enhance the damping effect and to achieve the damping effect over a greater range of temperatures.

The laid-open application DE 10 2015 116 442 A1 discloses a damping device having two different damping elements, which function at different temperatures.

The use of such damping means entails several problems, specifically highly temperature-dependent damping properties, complicated installation processes, significantly constrained spaces for placing the transducers, additional mass due to the damping material, great outlay in terms of development as every vehicle requires an individual solution, and, finally, additional costs.

A further possibility for reducing undesirable structure-borne sound according to the prior art is the use of stiffening elements in the immediate vicinity of the ultrasonic transducers or of the ultrasonic sensor system. The structure-borne soundwaves are thereby notably impeded in terms of their propagation.

The laid-open application DE 10 2012 106 700 A1 discloses a stiffening element that is intended to reduce vibrations of the wall.

This method is associated with problems for which there has not been a solution so far, specifically visual prominence, increased outlay during installation, constrained space for placing the ultrasonic sensor systems, additional mass due to the stiffening material, and additional costs.

One further branch of research deals with blocking out ultrasonic signals from neighbouring sensors, which propagate at the wall material. This is done as part of signal processing, for example by adjusting threshold values or blocking out a time window in which these interfering signals from the neighbouring sensors arrive. However, it has been found that, despite the great outlay involved, this process leads to inaccurate results, and accidents can therefore not be ruled out.

The previously mentioned examples from the prior art show that compensation of structure-borne sound specifically, and of noise in general, presents a problem that is still to be solved.

Proceeding from the abovementioned prior art, the invention is thus based on the object of specifying a method for computational noise compensation for an ultrasonic sensor system that is mounted optionally in a concealed or unconcealed manner, a system for computational ultrasound compensation, a vehicle, a computer program, a data carrier signal and a computer readable medium, which overcome the abovementioned disadvantages.

The object is achieved according to the invention by the features of the independent claims. Advantageous embodiments of the invention are specified in the dependent claims.

According to the invention, a method for computational noise compensation for a mounted ultrasonic sensor system is thus specified, in particular for a vehicle with a wall material, including the following steps:

detecting reference surroundings information comprising noise signal information relating to a wall material and/or airborne sound signal information, using an ultrasonic sensor of the ultrasonic sensor system;

storing the reference surroundings information;

detecting real-time surroundings information comprising noise signal information relating to the wall material and/or airborne sound signal information, using the ultrasonic sensor; and forming a difference signal between the pieces of surroundings information of reference surroundings information and real-time surroundings information, using a computational unit.

The method for computational noise compensation is preferably a method for computational structure-borne sound compensation.

Preferably, the last step of the method according to the invention is performed in the vehicle.

The present invention also specifies a system for computational ultrasound compensation having means for performing the steps of the method. The system for computational ultrasound compensation can be part of a driver assistance system for supporting autonomous or semi-autonomous driving of corresponding autonomous or semi-autonomous vehicles, or of a driver assistance system for supporting a driver of the vehicle in a variety of driving situations.

The invention furthermore specifies a vehicle having the system for computational ultrasound compensation. The vehicle is preferably an ego vehicle of a driver.

The invention furthermore specifies a computer program, comprising commands that, when the computer program is executed by a computer, cause the latter to perform steps of the method. A computer program is a collection of instructions for performing a specific task that is designed to solve a specific class of problems. The instructions of a program are designed to be executed by a computer, wherein it is necessary that a computer is capable of executing programs for it to function.

The invention furthermore specifies a data carrier signal that transmits the computer program.

The invention furthermore specifies a computer-readable medium, comprising commands that, when executed by a computer, cause the latter to perform steps of the method.

The underlying concept of the present invention is thus, for example, not to mechanically damp vibrations or noise, in particular structure-borne sound, of a wall material, but to take into account and filter out the vibrations as part of a signal processing operation. It is also possible to take into account temperature-dependent changes in the noise during the computational compensation of the latter. This method thus allows reliable detection by way of the ultrasonic sensor system, wherein the ultrasonic sensor system, which is mounted for example under the wall material, may have a large number of ultrasonic sensors that can detect simultaneously and permanently so as to achieve a continuously precise detection result. The method introduced allows a significant reduction in the outlay for both design and material, and it is therefore possible to realize a significant reduction in costs and weight with a comparable or even improved performance of the concealed ultrasonic detection system. This method for the compensation of structure-borne sound can also be used in an ultrasonic detection system that is mounted in an unconcealed manner, wherein the respective signal, which is generated by the reverberation of the membrane and may likewise be interpreted as structure-borne sound, is removed by computation for each measurement. The membrane in this case forms for example the wall material. In an unconcealed configuration of the ultrasonic transducers, the quality of the detection results from detections at a small distance, for example closer to 10 cm, increases.

In principle, pre-stored reference surroundings information, in particular for noise signal information, may be made available. These detections can take place for example by using sound absorbers, for example in a correspondingly configured sound studio.

Ultrasound is understood to mean sound at frequencies above the human audible frequency range. Consequently, it preferably comprises frequencies from 16 kHz. Sound of a frequency of above approximately 1 GHz is also referred to as hypersound. By contrast, frequencies below the human audible frequency range is referred to as infrasound.

In gases and liquids, ultrasound propagates in the form of a longitudinal wave. In solid bodies, transverse waves also propagate, due to shear stress. The transition from airborne sound into the solid body, or vice versa, can for efficiency reasons take place in particular using a coupling medium with an adapted acoustic impedance and a specific thickness.

Depending on the material of an obstacle, ultrasound is reflected, absorbed, scattered or transmitted by the former. As is the case for other waves, refraction, diffraction and interference also occur, with the result that the ultrasonic system has a highly sensitive design.

Air exhibits damping for ultrasound that strongly increases with the frequency. In liquids, by contrast, ultrasound propagates with low damping. However, damping can also be based on temperature fluctuations and/or changes in humidity in general.

The first step of the method is thus detecting reference surroundings information.

The invention does not require a distinction to be drawn between a single piece of information or several pieces of information, since doing so does not contribute to an inventive step. In addition, the reference surroundings information can include only noise signal information relating to the wall material and/or airborne sound signal information.

The wall material used is here an outer wall of the vehicle, for example a vehicle body component, or Gorilla glass used in a sliding roof.

Noise signal information refers to signal information that occurs in addition to, and possibly interferes with, desired sound detection. It is exactly this signal information that is intended to be compensated.

Airborne sound signal information refers to ultrasound located outside the wall material.

Next, the reference surroundings information is stored. This step can be done once or be repeated depending on defined conditions. It is essential for performing the method that reference surroundings information detected in a preceding step is retrievable at a later time.

If a reference surroundings information is stored so that it is retrievable, detection of real-time surroundings information, comprising noise signal information, in particular structure-borne sound signal information, of the wall material and/or airborne sound information is carried out using the ultrasonic sensor. In this way, further real-time information is detected in addition to the existing reference information. If a change in distance of a detected object has taken place between the time points of the different detections, this is also detected.

Finally, a difference signal is formed between the pieces of surroundings information of reference surroundings information and real-time surroundings information, using a computational unit. In this way, a reference measurement is subtracted in the time domain from the later real-time measurements. In this case, either the reference surroundings information can be subtracted from the real-time surroundings information or the real-time surroundings information can be subtracted from the reference surroundings information. It should be noted here that the computation algorithms are set uniformly.

The subsequent steps are carried out according to the prior art, in other words as in the case of ultrasonic sensors mounted on the outside. For example, a signal is typically used, in the present case the difference signal, in order to check any occurrences of the threshold value being exceeded, for example.

According to an advantageous embodiment of the invention, the wall material of the vehicle has a material thickness of at least 0.1 millimetres.

According to an advantageous embodiment of the invention, the wall material of the vehicle has a material thickness of at most, and including, 3.0 millimetres.

According to an advantageous embodiment, the invention is characterized by smoothing and/or filtering of the difference signal. Difference signals prepared for the subsequent computation process make possible a more reliable detection, or a detection that is less susceptible to errors, of the vehicle surroundings.

According to an advantageous embodiment of the invention, the ultrasonic sensor has a frequency of, and including, at least 40 kHz up to, and including, 80 kHz. It has been found that noise, in particular structure-borne sound, in this frequency range can be compensated easily, with the result that reliable detection, or detection that is not susceptible to errors, of the vehicle surroundings is made possible.

According to an advantageous embodiment of the invention, the difference signal between the pieces of surroundings information is formed based on raw data, an envelope, and/or another filtered reception signal, for example a correlation with a transmission signal of the ultrasonic sensor. Raw data require merely reduced computing power and thus accelerate the data utilization.

According to an advantageous embodiment of the invention, detection of the reference surroundings information is repeated at defined time intervals. In principle, any detected reference surroundings information can also encompass detected object. In order to make possible the most reliable and accurate detection, the detection of the reference surroundings information in one embodiment takes place at regular time intervals.

According to an advantageous embodiment of the above-mentioned embodiment, the defined time intervals are less than one minute. Preferred time intervals for making possible the most reliable and accurate detection can be, in particular, at least 10 milliseconds.

According to an advantageous embodiment of the invention, detection of the reference surroundings information is repeated in an event-based manner. That means that an external factor, as an event, initiates detection of the reference surroundings information. This reduces the number of computing operations.

According to an advantageous embodiment of the above-mentioned embodiment, detecting the reference surroundings information is repeated in an event-based manner such that a change in temperature and/or a change in humidity trigger repeated detection of the reference surroundings information. It has been found that these influences as events are suitable to repeatedly carry out a new detection if a defined magnitude of change in temperature and/or humidity is exceeded in a manner such that reliable detection is made possible.

According to an advantageous embodiment of the invention,
a signal component of at least one object detected by means of airborne sound signal information in the reference surroundings information produces a negative signal in the difference signal if the object has changed its position relative to the vehicle or relative to the respective ultrasonic transducer. This configuration makes available further data that can be used to increase the precision and reliability of the detection result. The negative signal or the object can be captured in particular on the basis of the amplitude change and/or the phase change.

According to an advantageous embodiment of the above-mentioned embodiment, the negative signal is used in its inverse as a positive signal in the real-time surroundings information for object tracking. Said negative signal can be used to track the object based on the characteristic data of the negative signal as a positive signal with respect to the previously known reference signal.

According to an advantageous embodiment of the invention, the computational unit is an application-specific circuit that is integrated in the ultrasonic sensor system. This makes reliable data processing in cost-effective structural units possible. An application-specific integrated circuit, ASIC, is an electronic circuit implemented in the form of an integrated circuit. The function of an ASIC is thus no longer changeable, but the production costs are lower with greater one-off costs.

According to an advantageous embodiment of the invention, the introduced method for computational sound compensation also finds use in connection with unconcealed ultrasonic transducers in order to make possible improved object detection in the close range of an ultrasonic transducer by calculating out, for each measurement, the signal that is produced by the reverberation of the wall material, which is in the form of a membrane, and that is likewise interpretable as structure-borne sound.

According to an advantageous embodiment of the invention,
the method is a method for computational structure-borne sound compensation and the noise signal information is structure-borne sound signal information. Structure-borne sound signal information is a type of noise signal information, wherein structure-borne sound that is detected by the ultrasonic sensor is considered structure-borne sound signal information, wherein this corresponds to vibrations of the wall material. Such an application is suitable in particular for ultrasonic transducers that are mounted in a concealed manner, for example on vehicles.

According to an advantageous embodiment of the invention, the introduced method for computational sound compensation finds application in connection with concealed and/or unconcealed ultrasonic transducers in order to block out in a targeted manner individual or a plurality of undesired airborne sound signals from the surroundings, for example coming from the trailer coupling or a bike rack, and also to detect very slight changes in an echo landscape of the surroundings that may under certain circumstances be complex, for example for detecting objects beneath the vehicle by means of ultrasonic sound transducers located in the region of the vehicle bottom, and/or to detect any changes in the structure-borne sound pattern, for example due to a change in temperature, soiling, deformation and/or damage. Damage can be considered to be for example a damaged glass pane. Here, at least one ultrasonic transducer can be attached to the glass pane and measure the structure-borne sound thereof. If the glass pane breaks, the detected structure-borne signal changes, meaning that damage to the glass can be deduced. As a result, a noise signal that remains the same compared to the initial noise signal acts as a signal for an unbroken glass pane.

The invention is explained in more detail below with reference to the attached drawing and on the basis of preferred embodiments. The illustrated features may represent an aspect of the invention both individually and in combination. Features of different exemplary embodiments may be transferred from one exemplary embodiment to another.

Figure 2:
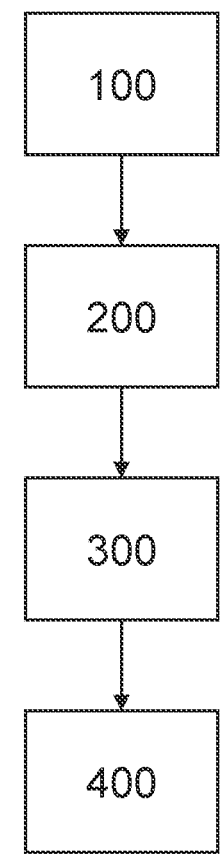
Figure 3:
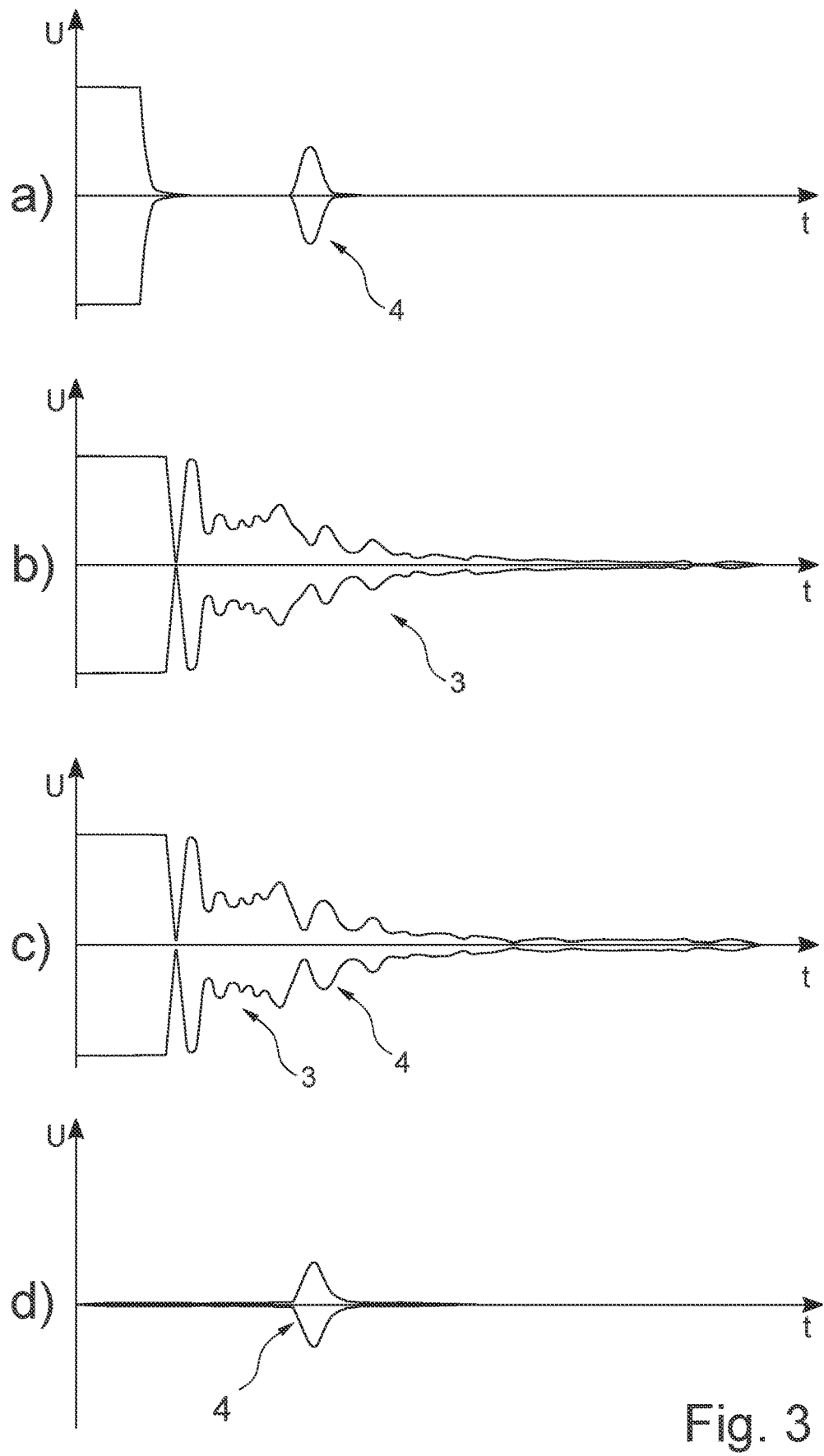

In the drawings:

FIG. 1 shows a schematic view of an ultrasonic sensor system according to a preferred embodiment of the invention, FIG. 2 shows a flowchart of a method for computational noise compensation for an ultrasonic sensor system that is mounted in a concealed manner, and FIG. 3 shows exemplary time domain signals of the method for computational noise compensation for mounted ultrasonic sensor systems.

FIG. 1 shows an ultrasonic sensor system 1 mounted in a concealed manner, having an ultrasonic sensor 5, which is arranged on a wall material 2 of the vehicle, for detecting noise signal information 3, in particular structure-borne sound signal information, and airborne sound signal information 4. As part of specific, preferred exemplary embodiments, the following text will assume that the noise signal information 3 is structure-borne sound signal information. The invention is not limited to ultrasonic sensors 5 that are mounted in a concealed manner, although these are used as an example in the exemplary embodiments to solve a specific problem.

Mounted in a concealed manner means that the ultrasonic sensor system 1 includes the transmitter and/or receiver within the vehicle in a manner such that visually it is not visible from the outside.

Processing of the structure-borne sound signal information and the airborne sound signal information 4 takes place in a computational unit 6.

In FIG. 1, there is no object that could be detected. However, such an object exists in the case of the ultrasound images according to FIGS. 3a, 3c and 3d.

FIG. 2 shows a flowchart of a method for computational noise or structure-borne sound compensation for the ultrasonic sensor system 1, which is mounted in a concealed manner, in particular for a vehicle with the wall material 2. The method includes at least the following steps:

detecting reference surroundings information 100 comprising noise signal information or structure-borne sound signal information 3 relating to a wall material 2 and/or airborne sound signal information 4, using an ultrasonic sensor 5 of the ultrasonic sensor system 1;

storing the reference surroundings information 200;

detecting real-time surroundings information 300 comprising noise signal information or structure-borne sound signal information 3 relating to the wall material 2 and/or airborne sound signal information 4, using the ultrasonic sensor 5; and forming a difference signal between the pieces of surroundings information 400 of reference surroundings information and real-time surroundings information, using a computational unit 6.

According to the advantageous embodiment according to FIG. 1, the computational unit 6 is an application-specific circuit that is integrated in the ultrasonic sensor system 1.

FIG. 3a shows a transmission and reception signal for an unconcealed ultrasonic sensor system 1 or an unconcealed ultrasonic sensor 5, as is known from the prior art. Here, an object from which illustrated airborne sound signal information 4 emanates is arranged in the detection region. Since the ultrasonic sensor 5 is unconcealed, it does not detect noise or structure-borne sound signal information 3.

FIG. 3b shows a transmission and reception signal for a concealed ultrasonic sensor system 1 or a concealed ultrasonic sensor 5 according to a preferred embodiment of the invention. In this case, no object is arranged in the detection region, which means that the airborne sound signal information 4 generates no signal spike. Since the ultrasonic sensor 5 is concealed, it detects noise or structure-borne sound signal information 3. Consequently, detection of reference surroundings information 100 without object takes place.

FIG. 3c shows a transmission and reception signal for a concealed ultrasonic sensor system 1 or a concealed ultrasonic sensor 5 according to a preferred embodiment of the invention. In this case, unlike in FIG. 3b, an object is arranged in the detection region, which means that the airborne sound signal information 4 generates a signal spike. Since the ultrasonic sensor 5 is concealed, it additionally detects noise or structure-borne sound signal information 3. However, these superpose, meaning that the object can probably not be identified from this detection alone. In other words, the signal relating to the object is covered by the signal relating to the structure-borne sound or to the wall material.

FIG. 3d shows in a schematically simplified manner the difference signal between the surroundings information 400 of reference surroundings information and real-time surroundings information.

If the reference measurement was performed while an object was located in the detection region, said object becomes visible in the difference signal as soon as it changes its position relative to the ultrasonic transducer. It may be sufficient in this case if the object changes its position relative to the ultrasonic transducer even in the submillimetre range.

According to an advantageous embodiment of the invention, the wall material 2 of the vehicle has a material thickness of at least 0.1 millimetres.

According to an embodiment, it is also preferred that
the wall material 2 of the vehicle has a material thickness of at most, and including, 3.0 millimetres. The structure-borne sound lying in this range is illustrated by way of example in FIG. 3b.

According to an advantageous embodiment of the invention, smoothing and/or filtering of the difference signal takes place.

According to an advantageous embodiment of the invention,
the ultrasonic sensor 5 has a frequency of, and including, at least 40 kHz up to, and including, 80 kHz. Ultrasound detections taking place at such a frequency produce sound signals as are illustrated by way of example in FIGS. 3a and 3d.

According to an advantageous embodiment of the invention,
the difference signal between the pieces of surroundings information 400 is formed based on raw data, an envelope, and/or another filtered reception signal, for example a correlation with a transmission signal of the ultrasonic sensor 5. FIG. 3 illustrates by way of example in a symbolized manner an envelope. That means that the ultrasonic signal is represented and processed by way of the envelope.

According to an advantageous embodiment of the invention,
detection of the reference surroundings information 100 is repeated at defined time intervals.

According to one advantageous embodiment of the previously mentioned embodiment, the defined time intervals are less than one minute, and in particular at least 10 milliseconds.

According to an advantageous embodiment of the invention,
detection of the reference surroundings information 100 is repeated in an event-based manner.

According to an advantageous embodiment of the previously mentioned embodiment, detecting the reference surroundings information 100 is repeated in an event-based manner such that a change in temperature and/or a change in humidity trigger repeated detection of the reference surroundings information 100.

According to an advantageous embodiment of the invention,
a signal component of at least one object detected by means of airborne sound signal information 4 in the reference surroundings information produces a negative signal in the difference signal if the object has changed its position relative to the vehicle or relative to the respective ultrasonic transducer.

According to an advantageous embodiment of the previously mentioned embodiment, the negative signal is used in its inverse as a positive signal in the real-time surroundings information for object tracking.

LIST OF REFERENCE SIGNS

1 Ultrasonic sensor system
2 Wall material of a vehicle
3 Noise signal information
4 Airborne sound signal information
5 Ultrasonic sensor
6 Computational unit
100 Detecting reference surroundings information
200 Storing the reference surroundings information
300 Detecting real-time surroundings information
400 Forming a difference signal between the pieces of surroundings information

The invention claimed is:

1. A method for computational noise compensation for an ultrasonic sensor system that is mounted in a concealed or unconcealed manner for a vehicle with a wall material, the method comprising:
   detecting reference surroundings information comprising noise signal information relating to the wall material and/or airborne sound signal information, using an ultrasonic sensor of the ultrasonic sensor system;
   storing the reference surroundings information;
   detecting real-time surroundings information comprising the noise signal information relating to the wall material and/or the airborne sound signal information, using the ultrasonic sensor;
   forming a difference signal between the reference surroundings information and real-time surroundings information, using a computational unit; and
   wherein detection of the reference surroundings information is repeated in an event-based manner.

2. The method for computational noise compensation according to claim 1, wherein the wall material of the vehicle has a material thickness of at least 0.1 millimetres.

3. The method for computational noise compensation according to claim 1, wherein the wall material of the vehicle has a material thickness less than or equal to 3.0 millimetres.

4. The method for computational noise compensation according to claim 1, characterized by smoothing and/or filtering of the difference signal.

5. The method for computational noise compensation according to claim 1, wherein the ultrasonic sensor has a frequency between 40 kHz and 80 kHz.

6. The method for computational noise compensation according to claim 1, wherein the difference signal is formed based on raw data, an envelope, and/or another filtered reception signal which includes a correlation with a transmission signal of the ultrasonic sensor.

7. The method for computational noise compensation according to claim 1, wherein detecting the reference surroundings information is repeated in the event-based manner such that a change in temperature and/or a change in humidity trigger repeated detection of the reference surroundings information.

8. The method for computational noise compensation according to claim 1, wherein a signal component of at least one object detected by means of airborne sound signal information in the reference surroundings information produces a negative signal when the at least one object has changed its position according to the difference signal.

9. The method for computational noise compensation according to claim 8, wherein the negative signal is used in its inverse as a positive signal in the real-time surroundings information for object tracking.

10. The method for computational noise compensation according to claim 1, wherein the computational unit is an application-specific integrated circuit (ASIC) that is integrated in the ultrasonic sensor system.

11. The method for computational noise compensation according to claim 1, wherein the method is a method for computational structure-borne sound compensation and the noise signal information is structure-borne sound signal information.

12. A system for computational ultrasound compensation having means for computational noise compensation for an ultrasonic sensor system that is mounted in a concealed manner, for performing steps of the method according to claim 1.

13. A vehicle having a system for computational ultrasound compensation according to claim 12.

14. A computer system, comprising commands that, when the computer system is executed by a computer, cause the computer to carry out the method according to claim 1.

15. A non-transitory computer-readable medium, comprising commands that, when executed by a computer, cause the computer to carry out the method according to claim 1.

* * * * *